April 22, 1941. F. TURRETTINI 2,239,261
DRILLING, MILLING, OR LIKE MACHINE TOOL
Filed March 6, 1940
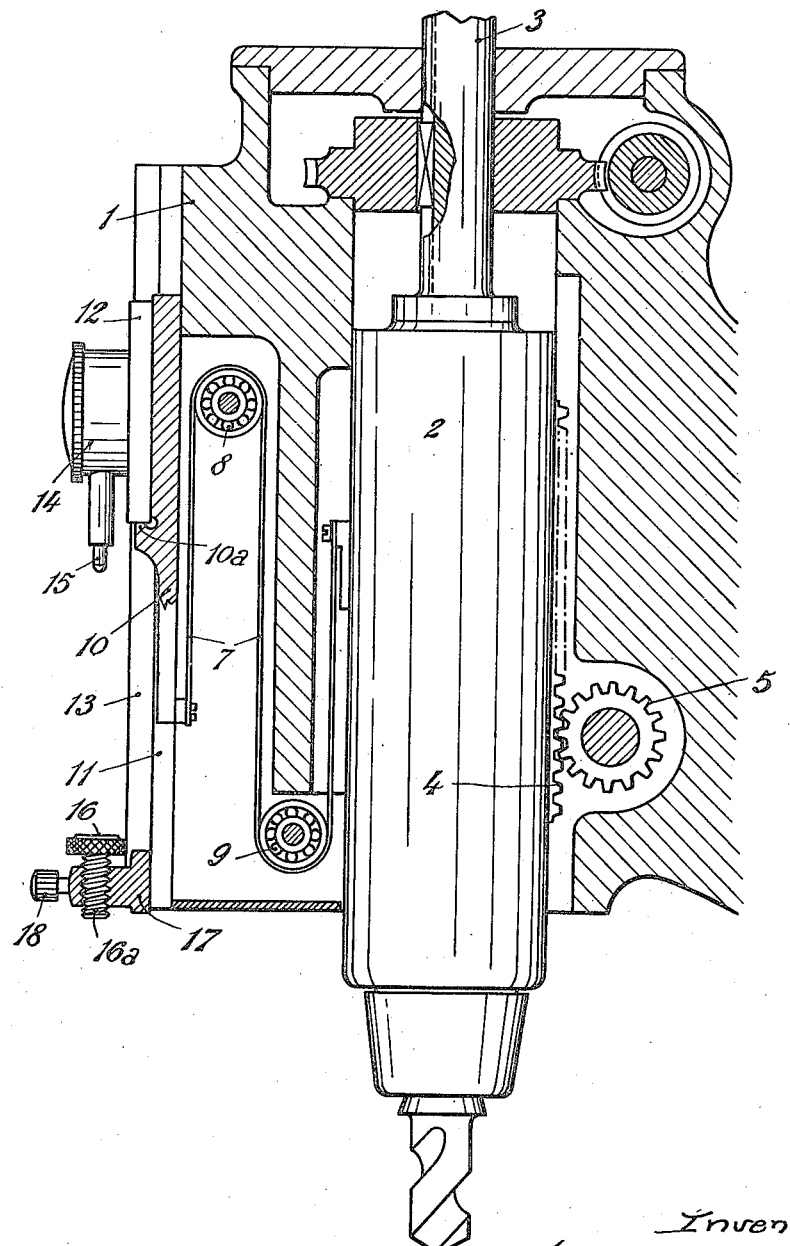
Inventor
Fernand Turrettini
By: Glascock Downing & Seebold Patented Apr. 22, 1941

2,239,261

UNITED STATES PATENT OFFICE 2,239,261

DRILLING, MILLING, OR LIKE MACHINE TOOL

Fernand Turrettini, Bellevue-Geneva, Switzerland, assignor to Societe Genevoise d'Instruments de Physique, Geneva, Switzerland, a firm of Switzerland Application March 6, 1940, Serial No. 322,609
In Switzerland July 22, 1939

1 Claim. (Cl. 33—181)

The present invention relates to a drilling, milling or like machine tool having a rotatable spindle carrying the tool and being displaceable along its axis, and a slide serving to measure the said displacement and moving in guideways arranged externally on the support of the spindle and parallelly to the spindle axis, for the same feed length in which the spindle is moved.

It is an object of the invention to provide simple and efficient means displaceable on the support of the spindle and adapted to cooperate with the above mentioned slide for measuring the axial feed of the rotatable spindle.

Another object of the invention resides in so constructing the mentioned slide as to permit the same to entrain a part of the said means in the direction of its return movement upon withdrawal of the spindle.

With these objects in view, the above specified machine tool provides a carriage displaceable on the support of the spindle, parallelly to the slide, a gauge-block table adjustably secured to the support, said carriage tending to approach said table and carrying a dial indicator adapted to cooperate with said table for measuring the axial spindle feed, and an abutment on the slide permitting the latter to entrain the said carriage only in the direction of withdrawal from the table.

The invention will be readily understood from the detailed description which follows, reference being had to the accompanying drawing which illustrates, by way of example, one embodiment thereof, and wherein the single figure represents a vertical section along the axis of the tool holding spindle.

In this figure, 1 is the spindle support, 2 is the sliding quill, and 3 is the tool holding spindle rotating within said quill. The latter is moved by a pinion 5 meshing with a rack 4 formed integral with the body of the quill, and this motion is transmitted by means of a flexible steel strip 7 to a slide 10 movable in guideways 11 of the spindle support 1. Said strip passes over two idlers 8 and 9 provided with ball bearings, and one of its extremities is attached to the slide 10, while the other extremity is attached to the quill 2.

The slide 10 moves in the guideways 11 for the same feed length as the quill 2, and owing to the arrangement shown of the idlers 8 and 9 in the same direction. Upon withdrawal of the spindle, the slide is drawn upwards by said spindle, and upon the slow advancing motion of the spindle it descends under the influence of its own weight.

In front of the slide 10 a carriage 12 is arranged which moves in guideways 13 parallel to those 11 of the slide 10. This carriage carries a dial indicator 14, the feeler 15 of which cooperates with a small table 16 adapted to receive the setting parallel gauge blocks. The table 16 is carried by a setting screw 16a engaged in the tapped hole of a slide 17 also movable in the guideways 13 and adapted to be locked at any point of said guideways by a clamping screw 18.

Finally, the slide 10 affords an abutment 10a adapted to entrain the carriage 12 upon withdrawal of the spindle. On the other hand, when said spindle advances the carriage 12 bears on said abutment by virtue of its own weight and will be arrested in its downward motion as soon as the feeler 15 resting on the table 16 or the gauge blocks placed upon said table comes to the end of its range, whereby the slide can continue its downward motion without provoking the slackening of the flexible strip 7, which slackening would be detrimental to the accurate working of the measuring device.

In the embodiment illustrated in the drawing, showing the vertical arrangement of the axis, the downward motion of the movable part is due to the weight of the carriage 12 and the dial indicator 14; should the direction of motion not be vertical, light springs or counter-weights may be provided for displacing the slide 10 and the carriage 12 towards the table 16.

I claim:

In a machine tool, a spindle support, an axially slidable quill, a tool holding spindle rotatable within said quill and bodily displaceable therewith, a slide movable along guideways disposed externally on the support and parallelly to the spindle axis, a flexible nonextensible pulling organ connecting the slide with the quill for imparting equal feed from said quill upon said slide, idlers for said pulling organ, assuring equally directed motion of both the quill and slide, a gauge-block table adjustably secured to the support, a carriage displaceable on the support, parallelly to the slide, and tending to approach said table, a dial indicator carried by said carriage and adapted to cooperate with said table for measuring the axial spindle feed, and an abutment on the slide permitting the latter to entrain the said carriage in the direction of withdrawal from the table.

FERNAND TURRETTINI.